Oct. 16, 1956     H. L. LOCKLEY ET AL     2,766,944
GARBAGE DISPOSAL DEVICE

Filed Jan. 7, 1953     2 Sheets-Sheet 1

INVENTORS
HARRY L. LOCKLEY
BY ROBERT C. KOSLO
Hudson, Boughton,
Williams, David & Hoffmann
ATTORNEYS

INVENTORS
HARRY L. LOCKLEY
BY ROBERT C. KOSLO
ATTORNEYS

United States Patent Office 2,766,944
Patented Oct. 16, 1956

2,766,944

GARBAGE DISPOSAL DEVICE

Harry L. Lockley, New Castle, Pa., and Robert C. Koslo, Parma, Ohio, assignors to Lockley Machine Company, New Castle, Pa., a corporation of Pennsylvania Application January 7, 1953, Serial No. 330,092

2 Claims. (Cl. 241—257)

This invention relates to comminuting devices of the garbage grinder type and as its principal object, aims to provide a novel form of waste disposal device of this kind.

As another of its objects this invention provides a novel garbage grinder having a sectional grinder housing defining a vertical-axis grinding chamber and including a lower housing section defining the bottom wall of the grinding chamber and a bottom recess in the under side of the grinder housing, and in which annular sheet metal bracket means at the lower end of the grinder housing permits the use and mounting of an electric driving motor of a conventional form thereon in a desired direct-connected relation, with a hollow portion of the bracket means extending into the bottom recess and accommodating the upper bearing boss of the motor housing.

Still another object is to provide such a novel garbage grinder having a direct-connected conventional form of driving motor and a rotor operable in the grinding chamber with a hollow stem extending through the bottom wall for substantially direct engagement by the shaft of the motor, and in which the motor is readily detachable from the grinder housing and rotor without disassembling any part of the grinder housing or affecting the fluid tightness thereof.

The invention can be further briefly summarized as consisting in certain novel combinations and arrangements of parts hereinafter described and particularly set out in the claims hereof.

In the accompanying sheets of drawings, forming a part hereof:

Figure 1:
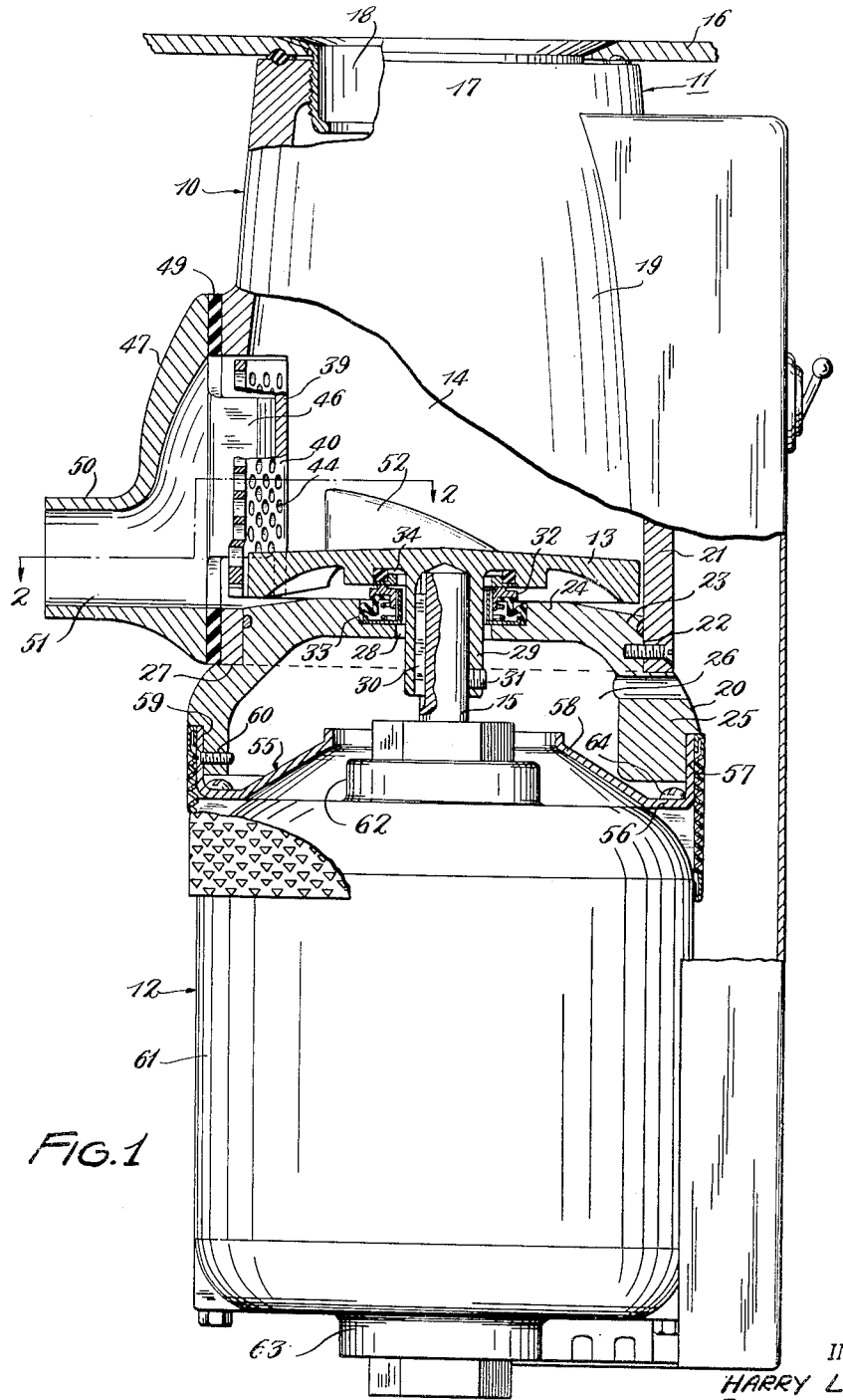
Fig. 1 is an elevation of a comminuting device with certain portions thereof broken away and showing a novel housing construction and motor mount for a device of this kind.

The novel grinder housing 10 is shown in the accompanying drawings as forming a part of a comminuting device 11 of the garbage grinder type. The comminuting device 11 also comprises an electric driving motor 12 at the lower end of the grinder housing 10, and a disk rotor 13 operable in the grinding chamber 14 and connected with the shaft 15 of the electric motor. The comminuting device 11 is here shown as being suspended from the bottom wall 16 of a kitchen sink, or the like, by having the upper end of the grinder housing 10 connected with such bottom wall by means of a flanged coupling 17 which also defines an inlet opening 18 for the grinding chamber 14.

The grinder housing 10 comprises connected upper and lower housing members 19 and 20 of which the upper housing member is an upright hollow member having a curved annular side wall defining the vertical-axis grinding chamber 14. The lower end of the housing member 19 defines a substantially cylindrical end opening 22 which corresponds substantially in diameter with the maximum diameter of the grinding chamber 14.

The lower housing member 20 forms a base or closure member for the upper housing member 19 and includes a substantially cylindrical plug portion 23 extending upwardly in telescoping relation into the bottom opening 22 and forming a transverse bottom wall 24 for the lower end of the grinding chamber 14. The lower housing member 20 also comprises a depending annular flange portion 25 which cooperates with the plug portion 23 in defining an upwardly extending recess or pocket 26 in the underside of the grinder housing 10. At or adjacent the junction of the depending flange portion 25 with the plug portion 23, the lower housing member 20 is provided with a laterally extending annular seat or shoulder 27 against which the end face of the annular side wall 21 of the upper housing member 19 abuts.

The plug portion 23 of the lower housing member 20 is provided with a substantially central opening 28 into which the vertical motor shaft 15 extends in substantially coaxial relation to the grinding chamber 14. The rotor 13 is provided with a depending hollow stem or shaft portion 29 which telescopingly engages the motor shaft 15 and is connected with the latter by means of the key 30 and the setscrew 31. The driving connection for the rotor 13 is sealed against the leakage of liquid therearound from the grinding chamber 14 by means of a suitable packing 32 disposed in surrounding relation to the hollow stem 29. A counterbore 33 provided in the plug portion 23, forms a seat for the lower end of the packing 32, and a counterbore 34 formed in the underside of the rotor 13 forms a seat for the upper end of the packing.

Figure 2:
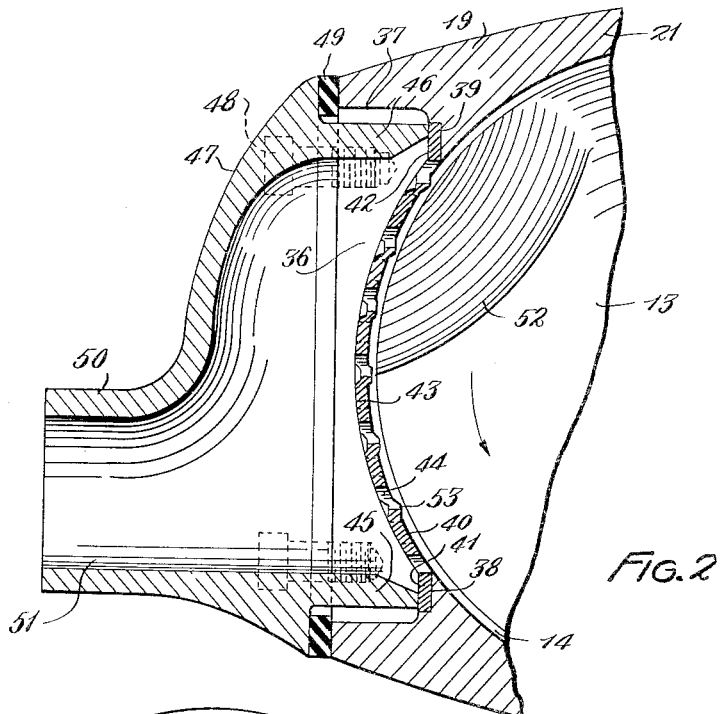
Fig. 2 is a partial transverse section on a somewhat larger scale and taken substantially as indicated by section line 2—2 of Fig. 1, but with an impeller lug of the rotor in overlapping relation to the outlet screen.
Figure 3:
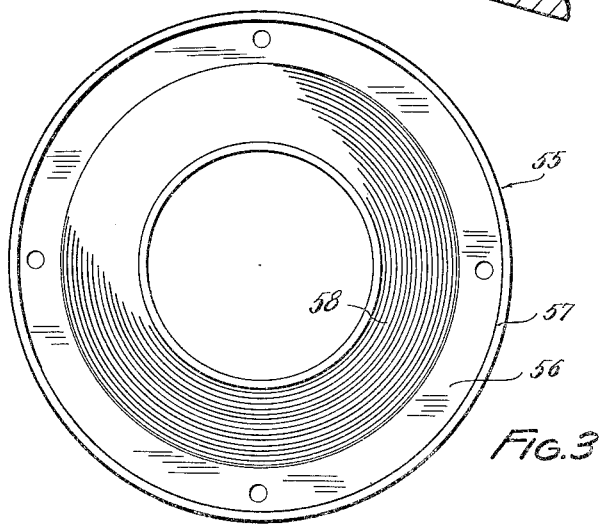
Fig. 3 is a top plan view of the motor mounting bracket in detached relation.
Figure 4:
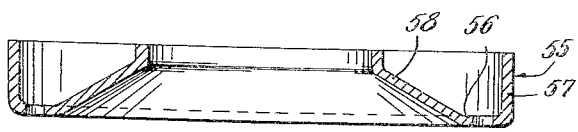
Fig. 4 is a transverse section through the bracket taken on section line 4—4 of Fig. 3.

The side wall 21 of the upper housing member 19 is provided with an outlet opening 36 which communicates with the grinding chamber 14 substantially radially thereof and which opening is located substantially entirely above the transverse bottom wall 24 of the grinding chamber. As shown in Fig. 2, the outlet opening 36 is formed in the side wall of the housing member 19 as an outwardly opening pocket or recess 37. On opposite sides of the outlet opening 36, the side wall of the housing member 19 is provided with a pair of outwardly facing substantially flat vertical seats 38 and 39 which are located at or adjacent the inner end of the recess 37.

The grinder housing 10 also includes a screen 40 connected with the housing member 19 and extending across the outlet opening 36. The screen 40 comprises a pair of substantially flat vertical side flanges 41 and 42 in engagement with the seats 38 and 39 and a curved intermediate portion 43 having numerous openings 44 therein and distributed over the area of such intermediate portion. The curved intermediate portion 43 forms the side wall of the grinding chamber 14 between the seats 38 and 39 and is exposed to the grinding chamber for the full width and height of the outlet opening 36. The curvature of the intermediate portion 43 of the screen is substantially the same as that of the annular wall 21, such that the screen forms a substantially smooth continuation of the curved side wall of the grinding chamber.

The screen 40 is moved into engagement with the seats 38 and 39 by being inserted into the housing member 19 through the pocket 37 and is held in clamped engagement with the seats by means of lug extensions 45 and 46 of a third housing member 47. The housing member 47 is removably connected with the housing member 19 by suitable screws 48 and with an interposed gasket 49 therebetween and forms a removable cover member for the recess 37. The housing member 47 carries a delivery spout 50 having a passage 51 therein which forms a discharge passage leading from the grinding chamber 14 through the outlet opening 36. The screen 40 can be removed from and replaced in the grinder housing 10 by merely detaching the housing member 47.

The rotor 13 is provided on the upper side thereof with one or more impeller lugs 52 of a suitable shape and which are moved around the side wall 21 of the grinding chamber 14 and across the lower portion of the screen 40 in relatively closely spaced running relation thereto. These lugs constitute shredding elements on the rotor and also enable the rotor to impart a rapid rotary or whirling motion to waste material, or a mixture of waste material and water, contained in the grinding chamber 14. This rapid whirling motion causes the pieces of waste material to be moved repeatedly across the screen 40 and to be pressed outwardly against the screen by centrifugal force and which centrifugal force also causes the small particles of the comminuted or ground waste material and water to be discharged from the grinding chamber through the openings 44 of the screen and to be delivered from the device through the passage 51 as a velocity stream. The screen 40 retains the larger pieces of waste material in the grinding chamber 14 until they have been reduced to a sufficiently small size to pass through the openings 44.

The screen 40 also serves as a shredding screen and, for this purpose, is provided with numerous inwardly projecting shredding elements 53 which are distributed over the curved intermediate portion 43 of the screen and are presented toward the grinding chamber 14 as the stationary shredding elements of the grinder housing 10. The shredding elements 53 cooperate with the shredding elements or impeller lugs 52 of the rotor 13 in comminuting or grinding the waste material and are also effective on their own account for comminuting or grinding the waste material as the result of the repeated movement of the pieces of waste material across the screen during their whirling motion in the grinding chamber and the outward movement and pressure with which such pieces are engaged against the screen as the result of centrifugal force. The shredding screen 40 and its comminuting function in combination with the rotor 13, are more fully disclosed and are claimed in copending patent application Serial No. 329,954 filed January 7, 1953, and assigned to the same assignee as the present application.

The grinder housing 10 also includes a motor mounting section or bracket 55 by which the electric driving motor 12 is supported and operably connected with the grinding unit in a direct-connected relation thereto. The bracket 55 is an annular bracket, preferably of sheet metal, comprising a substantially flat annular intermediate web portion 56 and outer and inner axial annular flange and frusto-conical portions 57 and 58 connected by such web portion. The flange portion 57 is disposed in an upwardly extending telescoping relation around an annularly undercut portion 59 of the lower housing member 20 and is connected with the latter by suitable screws 60.

The driving motor 12 includes a motor housing 61 having upper and lower axially projecting bearing bosses 62 and 63 in which the shaft 15 is rotatably journalled. The motor 12 is connected with the bracket 55 by having the upper end of the motor housing 61 secured against the flat annular web portion 56 by suitable screws 64. The upper bearing boss 62 of the motor housing extends into and is accommodated by the hollow frusto-conical portion 58 of the bracket.

From the foregoing description and the accompanying drawings, it will now be readily understood that this invention provides a novel form of housing for a comminuting device or garbage grinder which comprises a minimum number of parts or housing sections of such form that they can be economically made and assembled. It will, likewise, be seen that in this novel grinder housing, the shredding elements of the housing structure are provided by a screen which forms one of the housing members and extends across a side outlet opening of the grinding chamber. Additionally, it will be seen that the housing section forming the motor mount is in the form of an annular sheet metal member which provides for a direct-connected close-coupled relation between the grinding unit and the driving motor.

Although the novel housing structure of the present invention has been illustrated and described herein to a somewhat detailed extent, it will be understood, of course, that the invention is not to be regarded as being limited correspondingly in scope, but includes all changes and modifications coming within the terms of the claims hereof.

Having thus described our invention, we claim:

1. A waste disposal device comprising, an upright hollow housing structure defining a substantially vertical-axis grinding chamber, said housing structure having a transverse wall adjacent the lower end of said chamber and an annular portion depending below said transverse wall and defining a pocket in the underside of said housing structure, said housing structure also having a side discharge opening communicating with said chamber above said transverse wall, comminuting means in said chamber including a rotor, an annular sheet metal motor bracket comprising substantially coaxial flange and hollow truncated-cone portions connected by a substantially flat annular web portion and the flange portion of said bracket being an upturned annular flange portion telescopingly connected with said depending annular portion, said bracket being disposed with said web portion extending transversely of said pocket and said truncated-cone portion extending upwardly into said pocket, and an electric driving motor of a conventional form having a motor housing provided with an axially projecting bearing boss and a shaft projecting from said boss and connected with said rotor, said motor having the shaft-end of its housing connected to said web portion and said boss extending upwardly into said truncated-cone portion.

2. A waste disposal device as defined in claim 1 in which said rotor has a sleeve portion extending downwardly into said pocket, and in which connecting means connecting said shaft with said sleeve and said motor housing with said web portion are accessible from the exterior of said housing structure such that said motor is detachable from said rotor and housing structure, without affecting the fluid tightness of the latter.

References Cited in the file of this patent

UNITED STATES PATENTS

| | | |
|---|---|---|
| Re. 20,952 | Smith | Dec. 20, 1938 |
| 1,227,084 | Sparks | May 22, 1917 |
| 1,823,533 | Diehl | Sept. 15, 1931 |
| 2,012,680 | Hammes | Aug. 27, 1935 |
| 2,138,531 | Wise et al. | Nov. 29, 1938 |
| 2,220,729 | Powers | Nov. 5, 1940 |
| 2,273,712 | Koettgen | Feb. 17, 1942 |
| 2,428,420 | Green | Oct. 7, 1947 |
| 2,442,812 | Jordan | June 8, 1948 |
| 2,482,124 | Powers | Sept. 20, 1949 |
| 2,679,981 | Eisinga | June 1, 1954 |